United States Patent
Sumizawa et al.

(10) Patent No.: US 7,561,962 B2
(45) Date of Patent: Jul. 14, 2009

(54) ABRIDGED MAP GENERATING APPARATUS, ON-VEHICLE INFORMATION TERMINAL, ABRIDGED MAP DISTRIBUTION SYSTEM AND ABRIDGED MAP GENERATING METHOD

(75) Inventors: Akio Sumizawa, Zama (JP); Manabu Morita, Zama (JP); Atsushi Hiroike, Kokubunji (JP); Kishiko Maruyama, Kokubunji (JP); Akinori Asahara, Kokubunji (JP)

(73) Assignee: Xanavi Informatics Corporation, Zama-shi (JP)

(*) Notice: Subject to any disclaimer, the term of this patent is extended or adjusted under 35 U.S.C. 154(b) by 681 days.

(21) Appl. No.: 11/250,580

(22) Filed: Oct. 17, 2005

(65) Prior Publication Data
US 2006/0089795 A1 Apr. 27, 2006

(30) Foreign Application Priority Data
Oct. 18, 2004 (JP) .............................. 2004-302965

(51) Int. Cl.
*G01C 21/32* (2006.01)
(52) U.S. Cl. ...................... 701/208; 701/200; 701/201; 701/207; 701/211; 340/995.1; 340/995.12; 340/995.14; 340/995.15; 340/995.19
(58) Field of Classification Search ................. 701/208, 701/201, 206, 207, 210, 212, 213, 214, 224; 340/995.1, 995.11, 995.14, 995.15, 995.19, 340/995.22
See application file for complete search history.

(56) References Cited

U.S. PATENT DOCUMENTS

| | | | | |
|---|---|---|---|---|
| 6,049,753 A | * | 4/2000 | Nimura | 701/201 |
| 6,067,499 A | * | 5/2000 | Yagyu et al. | 701/201 |
| 6,216,086 B1 | * | 4/2001 | Seymour et al. | 701/202 |
| 6,246,417 B1 | * | 6/2001 | Kambe et al. | 345/619 |
| 6,490,522 B2 | * | 12/2002 | Sugiyama et al. | 701/211 |
| 2002/0103599 A1 | * | 8/2002 | Sugiyama et al. | 701/211 |
| 2004/0236507 A1 | * | 11/2004 | Maruyama et al. | 701/208 |
| 2005/0102097 A1 | * | 5/2005 | Tanizaki et al. | 701/208 |

FOREIGN PATENT DOCUMENTS

JP 11-202762 A 7/1999

OTHER PUBLICATIONS

Definition of "abridge" from Dictionary.com, pp. 1-4, Oct. 21, 2008.*

* cited by examiner

*Primary Examiner*—Khoi Tran
*Assistant Examiner*—Jonathan Sample
(74) *Attorney, Agent, or Firm*—Crowell & Moring LLP

(57) ABSTRACT

This abridged map generating apparatus includes a route searching unit that searches for a plurality of routes from a departure point to a destination which has been set, an abridged map generation unit that generates an abridged map in which road shapes of the routes which are searched out by the route searching unit are simplified, based upon road map data which specifies shapes of roads by shapes of links set for each predetermined road section, and a link compactification unit that compactifies links of the routes based upon relative positional relationships of the routes before the abridged map generation unit generates the abridged map.

5 Claims, 14 Drawing Sheets

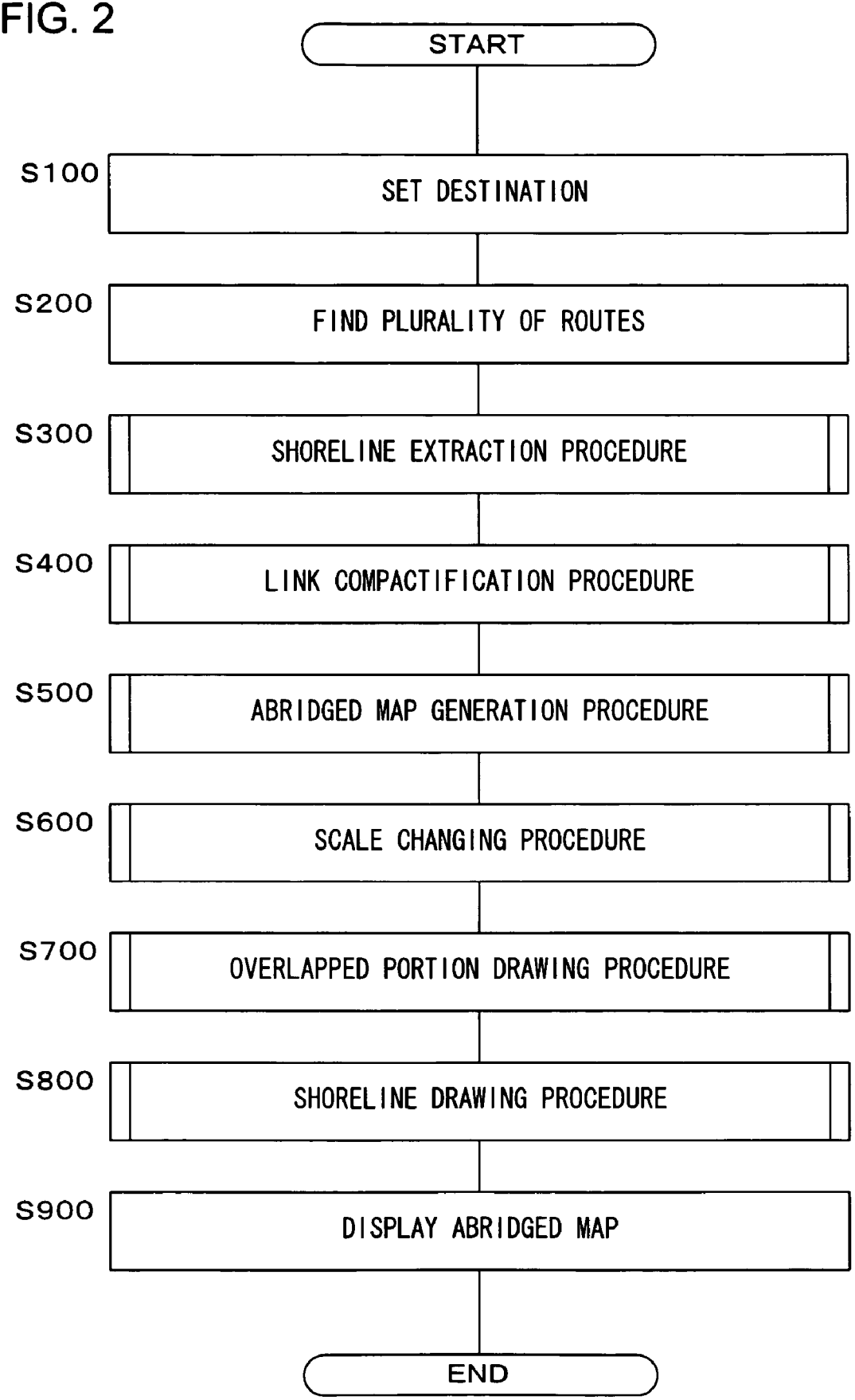

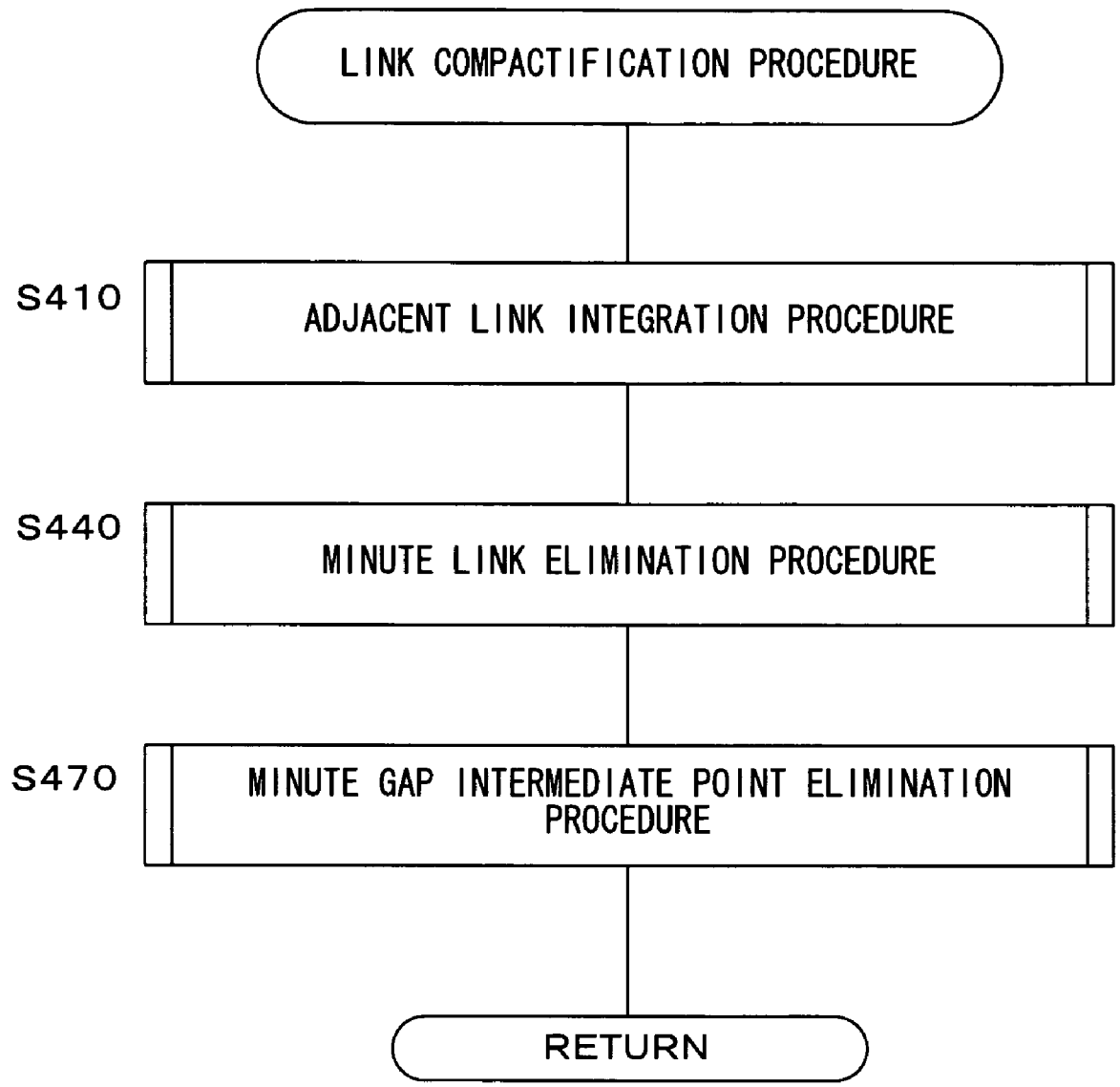

ADJACENT LINK INTEGRATION PROCEDURE

FIG. 6A
FIG. 6B
MINUTE LINK ELIMINATION PROCEDURE
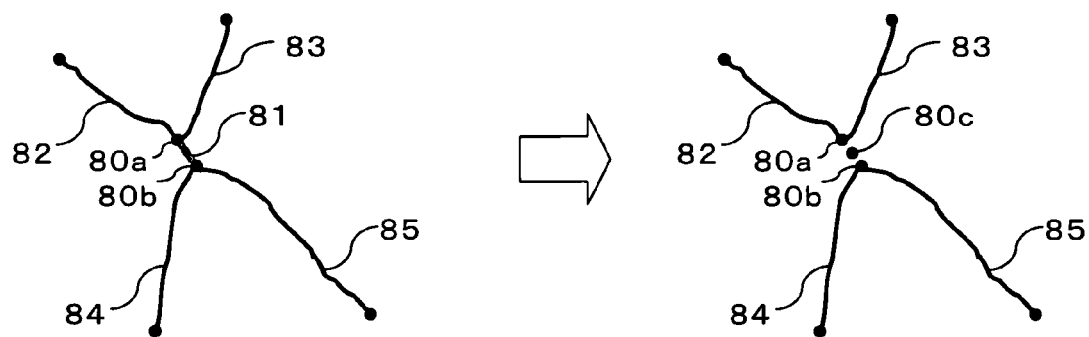
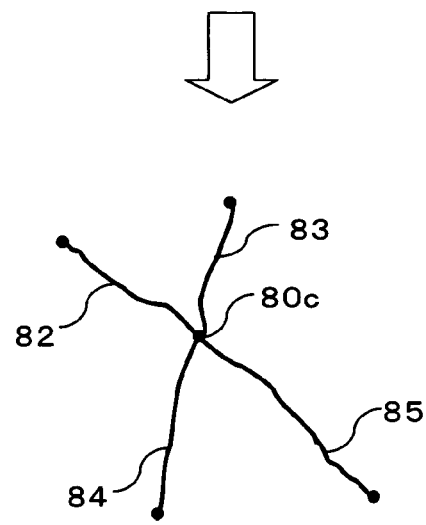
FIG. 6C

MINUTE GAP INTERMEDIATE POINT ELIMINATION PROCEDURE
FIG. 7A
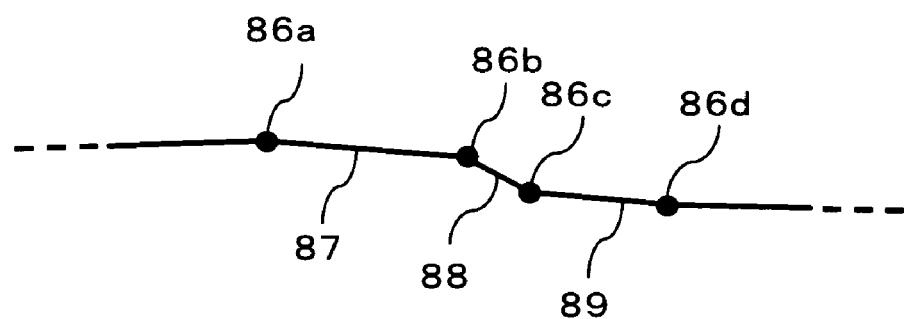
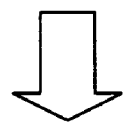
FIG. 7B
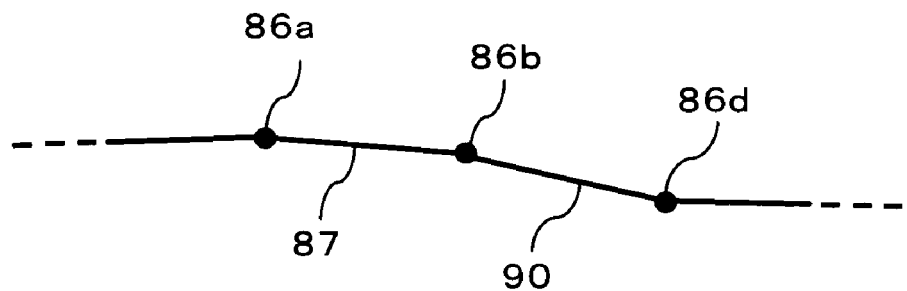

DIRECTION QUANTIZATION PROCEDURE
(WHEN DIVIDING INTO TWO SECTIONS)

DIRECTION QUANTIZATION PROCEDURE
(WHEN DIVIDING INTO FOUR SECTIONS)

CURRENT LINK

QUANTIZATION OF LINK DIRECTION

APPROXIMATE CURVE

ABRIDGED MAP GENERATING APPARATUS, ON-VEHICLE INFORMATION TERMINAL, ABRIDGED MAP DISTRIBUTION SYSTEM AND ABRIDGED MAP GENERATING METHOD

INCORPORATION BY REFERENCE

The disclosure of the following base priority application is hereby incorporated herein by reference: Japanese Patent Application No. 2004-302965 (filed upon 18 Oct. 2004).

BACKGROUND OF THE INVENTION

1. Field of the Invention

The present invention relates to an apparatus which generates an abridged map which has been produced by simplifying a road map.

2. Description of Related Art

There is a known method for simplifying the shape of a road based upon map data for displaying a map. For example, with the apparatus disclosed in Japanese Patent laid-open application Publication No. 11-202762, the shape of the road is simplified by performing procedures such as straightening or orthogonalization or the like upon the links which specify the road shape in the map data, and by displaying only landmark information within a range which is regulated by a mask. A map which is more easily viewed than a normal map is provided by displaying an abridged map generated using the road shape which has been simplified in this manner.

However, with the apparatus disclosed in Japanese Patent laid-open application Publication No. 11-202762, the abridged map is generated by simplifying the road shapes by performing procedures such as straightening or orthogonalization or the like upon each of the links. However, when simplifying a road shape by this type of processing method, if an abridged map of a plurality of routes is generated, it may happen that the road shape is not simplified appropriately. For example, when simplifying the road shapes for a plurality of routes which are mutually adjoining, it may happen that these routes overlap one another upon the abridged map.

SUMMARY OF THE INVENTION

The abridged map generating apparatus according to the present invention includes a route searching unit that searches for a plurality of routes from a departure point to a destination which are set, an abridged map generation unit that generates an abridged map, in which road shapes of the routes which are searched out by the route searching unit are simplified, based upon road map data which specifies shapes of roads by shapes of links set for each predetermined road section, and a link compactification unit that compactifies links of the routes based upon relative positional relationships of the routes before the abridged map generation unit generates the abridged map.

In the abridged map generating apparatus described above, it is desirable that if any two or more of the routes have respective adjacent portions where a distance between the routes is less than a predetermined value, the link compactification unit compactifies the links of the routes by integrating the adjacent portions into a single link.

In this abridged map generating apparatus, it is desirable that the link compactification unit obtains a first adjacent point P and a second adjacent point Q upon either a link A or a link B, each of which is a portion of some one of a plurality of the routes and the distance between the link A and the link B being less than the predetermined value, determines a single link C by connecting the first adjacent point P and the second adjacent point Q, and divides the link A and the link B into links A1 and B1 from respective heads of links A and B to the first adjacent point P, the link C, and links A2 and B2 from the second adjacent point Q to respective tails of the links A and B.

Furthermore, in the abridged map generating apparatus described above, flag information indicating that a plurality of roads are included in a link may be appended to the single link into which the adjoining portions have been integrated.

The on-vehicle information terminal according to the present invention includes the abridged map generating apparatus described above, and a display control unit that causes an abridged map generated by the abridged map generating apparatus to be displayed upon a display monitor.

The abridged map distribution system according to the present invention includes the abridged map generating apparatus described above, a distribution apparatus that distributes an abridged map generated by the abridged map generating apparatus, and a navigation apparatus that receives the abridged map distributed by the distribution apparatus.

The abridged map generating method according to the present invention includes searching for a plurality of routes from a departure point to a destination which are set, generating an abridged map in which road shapes of the routes which are searched out are simplified based upon road map data which specifies shapes of roads by shapes of links set for each predetermined road section, and compatifying links of the routes based upon relative positional relationships of the routes before generating the abridged map.

BRIEF DESCRIPTION OF THE DRAWINGS

FIG. 2 is a flow chart of a procedure which is executed when searching for a plurality of routes to a destination which has been set, and displaying an abridged map of these routes.

FIG. 4 is a flow chart showing the details of a link compactification procedure.

FIGS. 6A, 6B, and 6C are figures for explanation of the details of a minute link elimination procedure which is executed during the link compactification procedure.

FIGS. 7A and 7B are figures for explanation of the details of a minute gap intermediate point elimination procedure which is executed during the link compactification procedure.

DETAILED DESCRIPTION OF PREFERRED EMBODIMENTS

Figure 1:
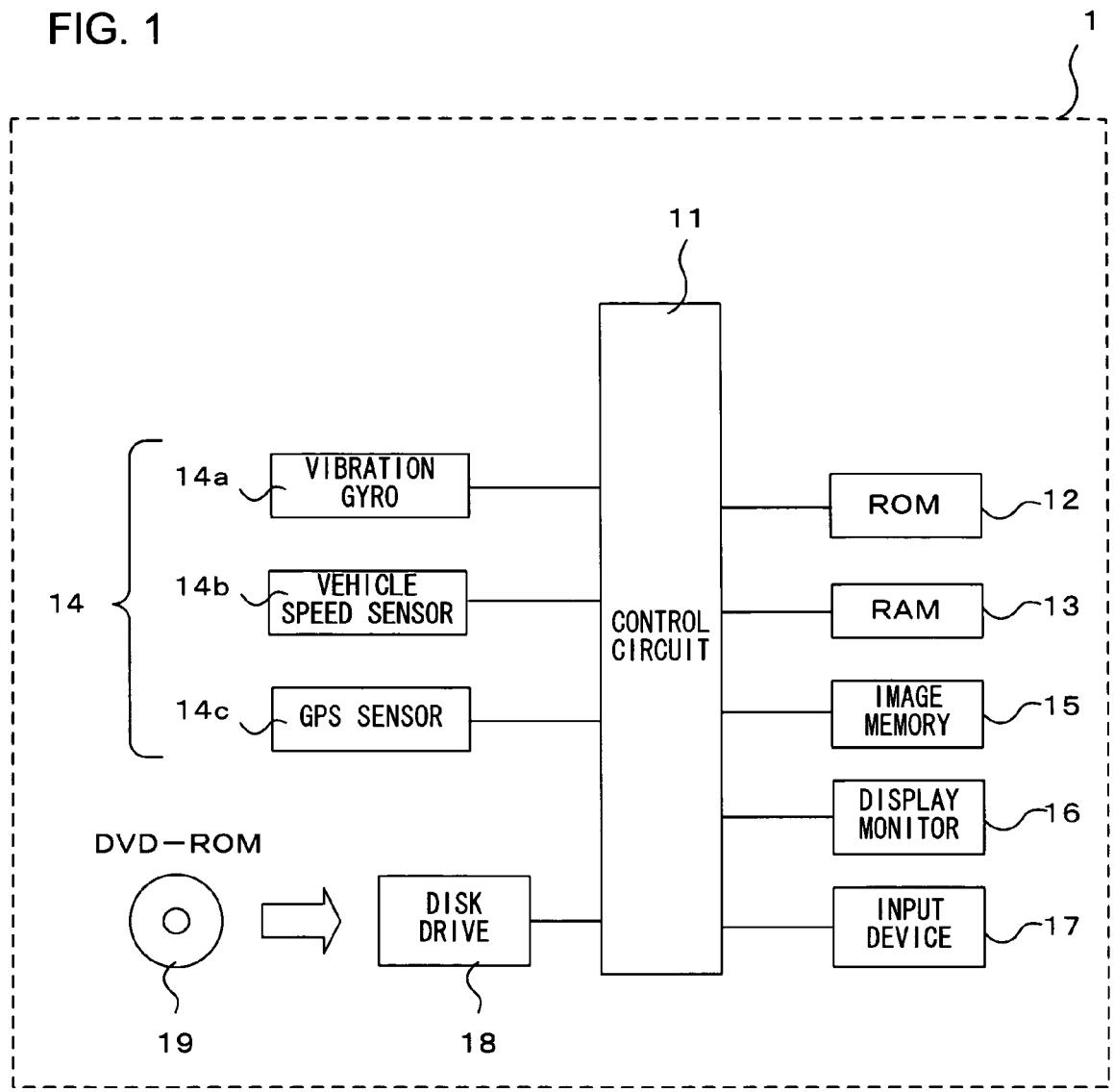
FIG. 1 is a block diagram showing the structure of a navigation apparatus according to an embodiment of the present invention.

The structure of the navigation apparatus according to an embodiment of the present invention is shown in FIG. 1. This navigation apparatus is mounted to a vehicle, and it searches out a plurality of routes to a destination which has been set, and generates and displays a map which has been abridged from a normal map (hereinafter termed an abridged map) by, for the entirety of each route, simplifying the road shapes and the like based upon the normal map. And one among the plurality of routes which have been displayed is selected by the user, and the vehicle is guided to the destination by taking this route as the recommended route. The navigation apparatus shown in FIG. 1 comprises a control circuit 11, a ROM 12, a RAM 13, a current position detection device 14, an image memory 15, a display monitor 16, an input device 17, and a disk drive 18. A DVD-ROM 19 upon which map data is recorded is loaded in the disk drive 18.

The control circuit 11 consists of a micro processor and its peripheral circuitry, and, using the RAM 13 as a work area, it performs various types of procedures and control by executing a control program which is stored in the ROM 12. By procedures which will be explained hereinafter being executed by this control circuit 11, a plurality of routes to a destination which has been set are searched out based upon the map data recorded in the DVD-ROM 19, an abridged map for the entirety of each of the routes is generated and displayed upon the display monitor 16.

The current position detection device 14 is an apparatus for detecting the current position of the vehicle, and it may comprise, for example, a vibration gyro 14*a* which detects the direction of progression of the vehicle, a vehicle speed sensor 14*b*. Which detects the vehicle speed, a GPS sensor 14*c* which detects the GPS signals from GPS satellites, and the like. Based upon the current position of the vehicle which has been detected by this current position detection device 14, the navigation apparatus 1 is able to determine the route search start point when searching for a recommended route.

The image memory 15 temporarily stores image data for display upon the display monitor 16. This image data consists of data for road map drawing and various types of diagrammatical data for image display of an abridged map and the like, and is generated by the control circuit 11, based upon the map data which is recorded on the DVD-ROM 19. An abridged map of the entirety of each of the various routes is displayed upon the display monitor 16, using this image data stored in the image memory 15.

The input device 17 has various types of input switches for the user to perform setting of the destination and the like, and this may be implemented as an operation panel or a remote controller or the like. By actuating the input device 17 according to instructions which are displayed upon the display monitor 16, the user can designate the name of a place or a position upon the map and set it as a destination, and can cause the navigation apparatus 1 to start searching for a route to this destination.

The disk drive 18 reads out map data which is to be used for generating an abridged map from the DVD-ROM 19 which is loaded. It should be understood that although herein, by way of example, the explanation is given in terms of the use of a DVD-ROM, it would also be acceptable to read out the map data from some other recording media other than a DVD-ROM, such as, for example, a CD-ROM or a hard disk or the like. In this map data, there may be included route calculation data which is used for calculating a plurality of routes, route guidance data such as intersection names, road names or the like, which is used for guiding the vehicle to the destination according to a recommended route which has been selected by the user, road data which specifies roads, and background data or the like which indicates map shapes other than roads, such as shorelines, rivers, railroads, various types of facilities (landmarks) upon the map, and so on.

In such road data, the minimum unit which indicates a road section is termed a link. In other words, each road is made up from a plurality of links which are set for each predetermined road section. It should be understood that the lengths of the road sections set by the links are different; the length of a link is not constant. The points which are connected together by the links are termed nodes, and each of these nodes includes position information (coordinate information). Furthermore, points which are termed shape interpolation points between one node and another may also be set within the links. Each of the shape interpolation points includes position information (coordinate information), just like the nodes. The shapes of the links, in other words the shape of the road, are determined by the position information of these nodes and shape interpolation points. Corresponding to each link described above, a value termed the link cost is set in the route calculation data for indicating the transit time required by the vehicle.

When a destination is set by operation of the user to the input device 17 as described above, the flow chart shown in FIG. 2 is executed by the control circuit 11. Due to this, route calculation of route from the current position, which has been detected by the current position detection device 14 as a route search start point, to the destination which has been set is performed according to a predetermined algorithm based upon the route calculation data, and a plurality of routes to the destination are obtained. An abridged map of the entirety of each of the routes which have been obtained in this manner is generated based upon the road data, and is displayed upon the display monitor 16.

The flow chart of FIG. 2 will now be explained in the following. In a step S100, the destination for route searching is set according to the destination which has been inputted by the user. In a step S200, a plurality of routes are searched out from the current position of the vehicle, which is the route search point, to the destination which was set in the step S100. At this time, the route calculation is performed according to the predetermined algorithm, based upon the route calculation data, as described above. It should be understood that the current position of the vehicle is obtained by the current position detection device 14 repeatedly at fixed intervals.

Moreover, in the step S200, in order to find a plurality of routes, the route searching is performed according to various route searching conditions. For example, route searching may be performed according to a route searching condition such as toll road priority, normal road priority, distance priority, or the like, and, by obtaining the most suitable route under each condition, a plurality of routes may be found. Or a plurality of routes may also be searched out by looking for routes other than the most suitable route under a single route searching condition. For example, it would be possible to find a plurality of routes with a single route searching condition by taking the route for which the total of the link costs to the destination is the smallest as the most suitable route, and by moreover obtaining a route search result which also includes routes for which the difference of the total link cost with respect to this most suitable route is within a predetermined value.

In a step S300, a shoreline extraction procedure is executed. Here, as a preliminary procedure which is required for executing the shoreline drawing procedure of the step S800, the shapes of the shorelines which are within a predetermined range from each route which has been found in the step S200 are extracted. It should be understood that, according to requirements, this shoreline extraction procedure may be executed, or may not be executed. Since these procedural details have no direct relationship with the present invention, the detailed explanation thereof will be curtailed.

In a step S400, a link compactification procedure is executed. Here, as a preliminary procedure in order to make it possible to perform proper processing in the abridged map generation procedure of the step S500, a procedure is performed of compactifying the links for each route which has been found in the step S200. In concrete terms, a procedure of integrating together adjacent portions of a plurality of links into a single link (an adjacent link integration procedure), a procedure of eliminating minute links (a minute link elimination procedure), and a procedure of eliminating shape interpolation points for which the gap to a neighboring point is minute (a minute gap intermediate point elimination procedure) are executed for each of the routes. The details of this link compactification procedure will be explained hereinafter.

In a step S500, an abridged map generation procedure is executed upon each of the routes which was found in the step S200, and upon which furthermore, according to requirements, the link compactification procedure of the step S400 was executed. The contents of the processing at this time will be explained hereinafter in detail. By this abridged map generation procedure, an abridged map is generated which shows each of the routes in its entirety, in other words from the current position to the destination.

In a step S600, a scale changing procedure is executed. Here, a procedure is performed of partially changing the scale of the abridged map which was generated in the step S500. For example, the scale of the surroundings of the departure point or the destination may be made larger than that of other portions, so that the surroundings of the departure point or the destination are magnified and are made more easy to see. It should be understood that, according to requirements, this scale changing procedure may be executed, or may not be executed. Since these procedural details have no direct relationship with the present invention, the detailed explanation thereof will be curtailed.

In a step S700, an overlapped portion drawing procedure is executed. Here, a procedure is performed of, for the abridged map which was generated in the step S500, drawing the portions where two or more routes overlap one another in a display format which makes it possible to distinguish between each of these routes. For example, the routes may be drawn as slightly mutually displaced from one another. It should be understood that, according to requirements, this overlapped portion drawing procedure may be executed, or may not be executed. Since these procedural details have no direct relationship with the present invention, the detailed explanation thereof will be curtailed.

In a step S800, a shoreline drawing procedure is executed. Here, a procedure is performed of drawing shorelines within a predetermined range from the routes, based upon the shapes of shorelines which were extracted in the step S300. It should be understood that, according to requirements, this shoreline drawing procedure may be executed, or may not be executed. Since these procedural details have no direct relationship with the present invention, the detailed explanation thereof will be curtailed.

In a step S900, the abridged map of the routes which was generated in the step S500, and upon which additionally, according to requirements, the procedures of the steps S600~S800 have been performed, is displayed upon the display monitor 16. At this time, a departure point mark and a destination mark are displayed upon the departure point and upon the destination, respectively. After having performed this step S900, the flow chart of FIG. 2 terminates. By doing as has been explained above, a plurality of routes to the destination are searched out and an abridged map of the entirety of each routes is displayed upon the display monitor 16.

Having executed the procedures of the flow chart of FIG. 2 and displayed an abridged map of the entirety of each of the routes upon the display monitor 16, thereafter the navigation apparatus 1 instructs the user to select one from among the routes. When any one of the routes is selected by the user actuating the input device 17, the selected route is set as the recommended route, and is displayed upon the road map of the surroundings of the current position with an indication that it is the recommended route. And the vehicle is directed according to this recommended route, and is guided to the destination. It should be understood that at this time, as a road map of the surroundings of the current position, either a normal map or an abridged map may be displayed. At this time, an abridged map may be generated by the same procedure as that of the flow chart of FIG. 2.

Figure 3A:
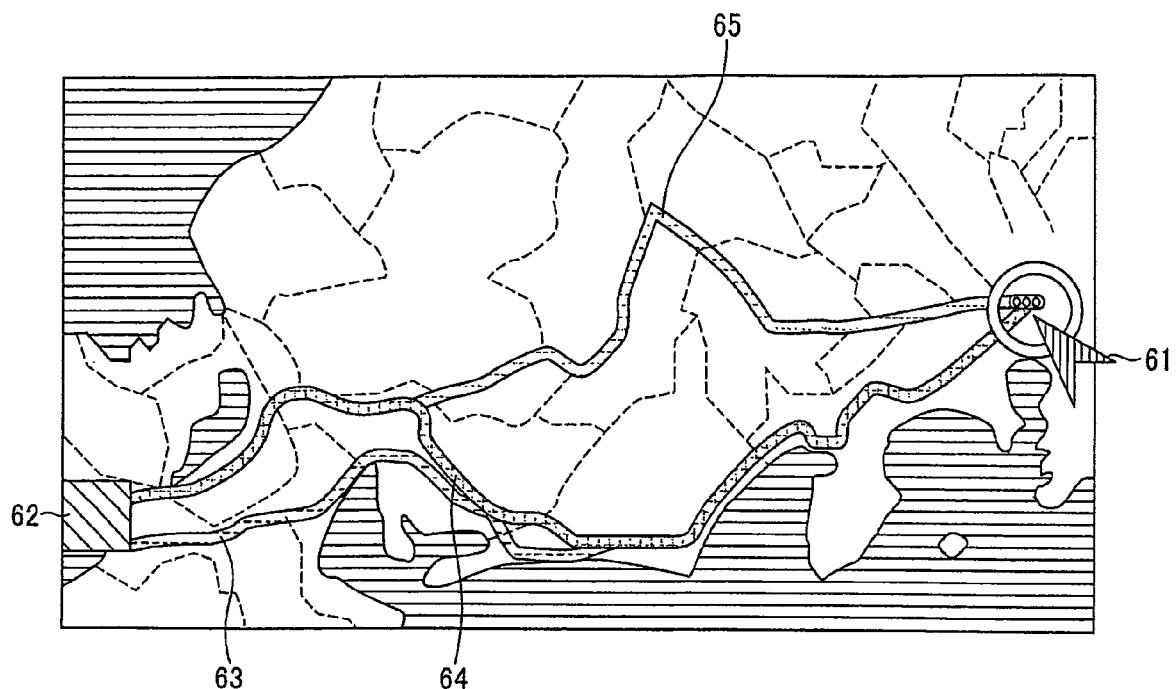
FIG. 3A is a figure showing the map before abridgement.
Figure 3B:
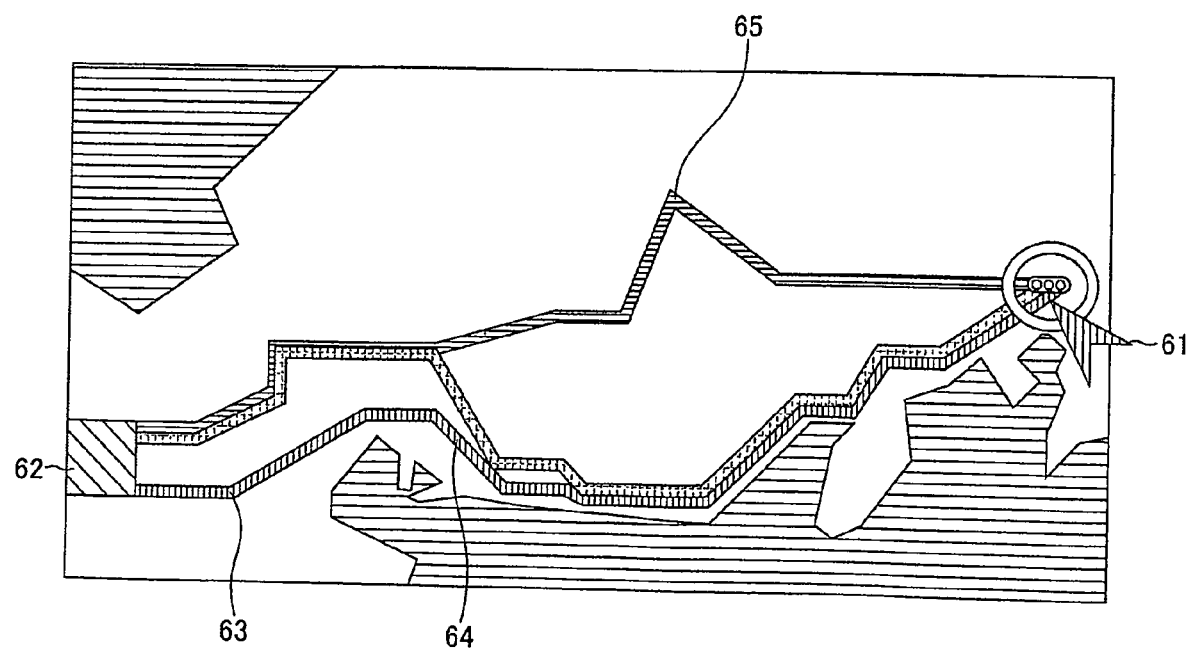
FIG. 3B is a figure showing the map after abridgement.

FIG. 3A and FIG. 3B are figures showing a normal map before abridgement, and an abridged map which has been displayed by executing the procedures of the flow chart of FIG. 2. In the map before abridgement shown in FIG. 3A, three routes 63, 64, and 65 which connect from the current position 61 to the destination 62 are shown. The abridged map of FIG. 3B is displayed by executing the procedures of the flow chart of FIG. 2 upon these routes 63~65. It will be understood that, in this abridged map, the road shape of each of the routes 63~65 is simplified. After having displayed the abridged map of each of the routes by doing this, whichever one of the routes has been selected is taken as the recommended route, and the vehicle is guided from the current position 61 to the destination 62.

Next, the details of the link compactification procedure which is executed in the step S400 will be explained. In the link compactification procedure, according to the flow chart shown in FIG. 4, in their respective order, an adjacent link integration procedure is performed in a step S410, a minute link elimination procedure is performed in the next step S440, and a minute gap intermediate point elimination procedure is performed in the next step S470. In the following, the details of these procedures will be explained.

Figure 5A:
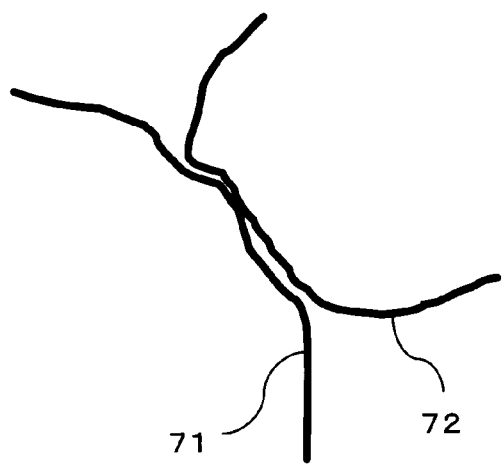
FIGS. 5A and 5B are figures for explanation of the details of an adjacent link integration procedure which is executed during the link compactification procedure.
Figure 5B:
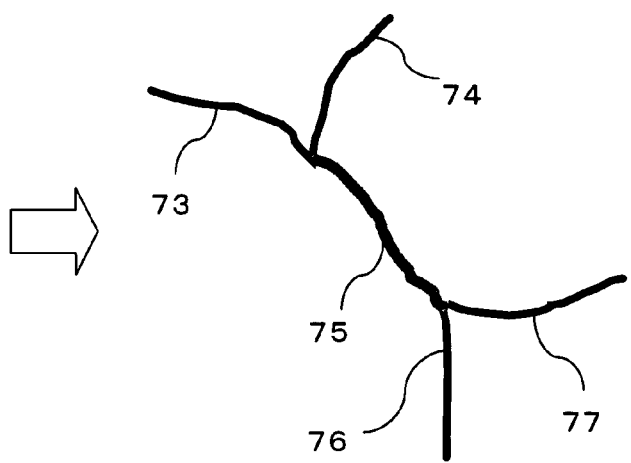

FIGS. 5A and 5B are figures for explaining the details of the adjacent link integration procedure; in FIG. 5A, a situation is shown in which a plurality of links have portions which are mutually adjacent one another. It should be understood that, the phrase of a plurality of links having portions which are mutually adjacent one another means that a portion exists in which the distance between these links is below a predetermined value. The link 71 and the link 72 in FIG. 5A are links each of which is included in a different route, and which have portions mutually adjacent one another. In other words, the route which includes the link 71 and the route which includes the link 72 have respective portions (adjoining portions) for which the distance between these routes is below a predetermined value.

If, in this manner, in the adjacent link integration procedure, a plurality of routes have mutually adjoining portions, then by creating a new link 75, as shown in FIG. 5B, these adjoining portions are integrated into a single link. At this time, the original link 71 and the link 72 shown in FIG. 5A are each divided before and after the link 75, as shown in FIG. 5B. The link 71 is divided into the links 73, 75, and 76, while the link 72 is divided into the links 74, 75, and 77. By doing this, the portions of the plurality of links which adjoin one another are integrated together and are expressed as a single link.

To this link 75 which has been integrated there is appended flag information which indicates that it is included in two roads. By using this flag information it is possible, when drawing the link 75 after abridgement in the abridged map during the overlapped portion drawing procedure of the step S700 of FIG. 2, to draw in a display format which makes it possible to distinguish each of the plurality of routes in which it is included. It should be understood that the contents of this adjacent link integration procedure will be explained in detail hereinafter.

FIGS. 6A, 6B, and 6C are figures for explanation of the details of the minute link elimination procedure. It will be supposed that, among the links 81 through 85 shown in FIG. 6A, the link 81 is a minute link. It should be understood that, when the length of a link is shorter than a predetermined value which is set in advance, it is considered that this link is a minute one. The nodes 80a and 80b designate the two endpoints of the link 81. It should be understood that these nodes, apart from being the end points of the link 81, are also the one end points of the links 82 through 85.

In the minute link elimination procedure, the minute link 81 of the type described above is eliminated, and moreover, as shown in FIG. 6B, a node 80c is newly created at a position intermediate between the nodes 80a and 80b, which are the two end points of the minute link 81 which has been eliminated. After this, as shown in FIG. 8C, the nodes 80a and 80b are eliminated. At this time the links 82 through 85, which were connected to one or the other of the nodes, 80a and 80b which have been eliminated, are connected to the node 80c which has been newly created. By doing this, the minute link is eliminated.

FIGS. 7A and 7B are figures for explanation of the details of the minute gap intermediate point elimination procedure. Each of the points 86a through 86d shown in FIG. 7A is a shape interpolation point which is set within a link. These shape interpolation points are also termed intermediate points. The line segments 87, 88, and 89 denote the portions of the link which connect between the shape interpolation points (intermediate points) 86a and 86b, 86b and 86c, and 86c and 86d, respectively. Among these, it will be supposed that the line segment 88 is a minute line segment, so that the gap between the shape interpolation points 86b and 86c, which are its two end points, is minute. It should be understood that, when the length of the line segment which connects between the shape interpolation points is shorter than a predetermined value which is set in advance, it is considered that the length of this line segment is minute, and that the gap between these shape interpolation points is minute.

In the minute gap intermediate point elimination procedure, one of the shape interpolation points 86b and 86c, for which the gap is minute as described above, is eliminated. At this time, that shape interpolation point is eliminated for which the length of the line segment, which connects to the side opposite to the minute line segment 88, is the shorter. Here, for the line segment 87 which connects to the shape interpolation point 86b, and the line segment 89 which connects to the shape interpolation point 86c, as shown in FIG. 7A, the line segment 89 is the shorter. Accordingly, as shown in FIG. 7B, the shape interpolation point 86c is eliminated. When the shape interpolation point 86c has been eliminated, a line segment 90 which connects between the two neighboring shape interpolation points 86b and 86d is created, instead of the line segments 88 and 89. By doing this, the shape interpolation point for which the gap to a neighboring point is minute is eliminated. It should be understood that, when the gap between a shape interpolation point and a link end point (a node) is minute, it is the shape interpolation point which is eliminated, and it is ensured that the node is not eliminated.

Figure 8:
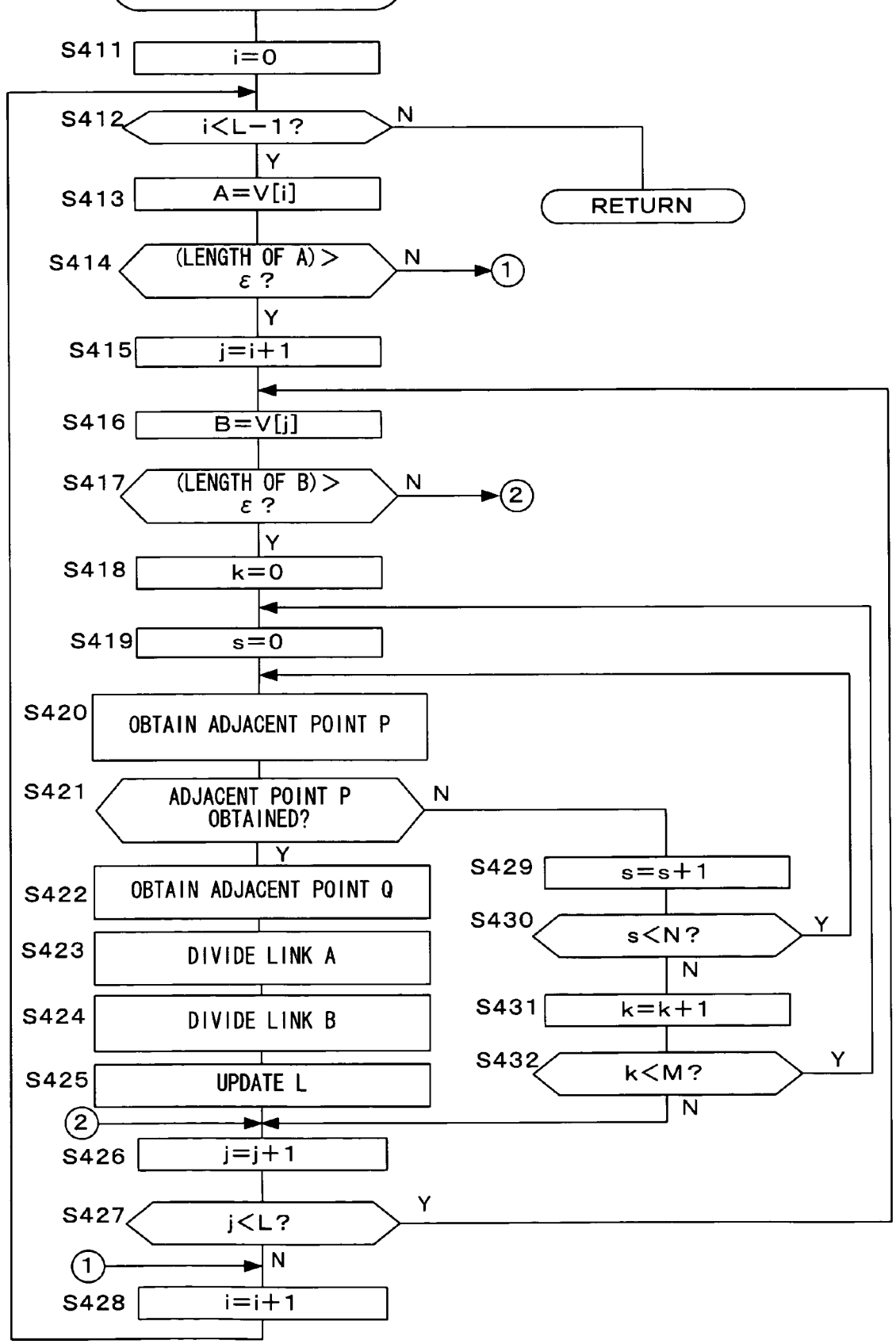
FIG. 8 is a flowchart showing the details of the adjacent link integration procedure.

Next, the contents of the adjacent link integration procedure will be explained in detail. In FIG. 8, there is shown a flow chart of the procedure which is executed during this adjacent link integration procedure. It should be understood that variables i, j, k, s, and L are used when executing this flow chart. Among these, as the initial value of L, there is set the total number of all the links which are included in all the routes which have been found in the step S200 of FIG. 2. Furthermore, each of all these links is designated as V[t] (t=0, 1, 2, ...). At this time, the maximum value which t can assume is (the total number of all the links−1). In other words, (the maximum value of t+1)=(the initial value of L). In the following, the flow chart of FIG. 8 will be explained.

In a step S411, i=0 is set as the initial value of the variable i. In a step S412, based upon the values of the variable L and the variable i at this time point, a decision is made as to whether or not i<L−1. If i<L−1, then the flow of control proceeds to the next step S413. If i is not <L−1, in other words if i≧(L−1), then the flow chart of FIG. 8 terminates. In this case, the adjacent link integration procedure of the step S410 of FIG. 4 terminates, and the minute link elimination procedure of the next step S440 is executed.

In a step S413, some one of the links is selected as the link A, based upon the value of the variable i at this time point, so that A=V[i]. In a step S414, a decision is made as to whether or not the length of the link A which was selected in the step S413 is greater than a predetermined value ε. If (the length of A)>ε, then the flow of control proceeds to a step S415, while if this is not the case, in other words if (the length of A)≦ε, then the flow of control proceeds to a step S428 which will be explained hereinafter. It should be understood that the predetermined value of ε in this case is set in advance. In the step S415, the value of i incremented by 1 is substituted into the variable j, so that j=i+1.

In a step S416, some one of the links is selected as the link B, based upon the value of the variable j at this time point, so that B=V[j]. In a step S417, a decision is made as to whether or not the length of the link B which was selected in the step S416 is greater than the predetermined value ε. If (the length of B)>ε, then the flow of control proceeds to a step S418, while if this is not the case, in other words if (the length of B)≦ε, then the flow of control proceeds to a step S426 which will be explained hereinafter. In the step S418; k=0 is set for the variable k. In a step S419, s=0 is set for the variable s.

In a step S420, an adjacent point P upon the link A or the link B is obtained. The method by which the adjacent point P is obtained in this step S420 will be explained in detail hereinafter. In a step S421, a decision is made as to whether or not an adjacent point P was obtained in the step S420. If an adjacent point P was obtained in the step S420, then the flow of control proceeds to the next step S422. On the other hand, if no adjacent point P was obtained in the step S420, then the flow of control proceeds to the step S429. In the following, the case in which the flow of control has proceeded to the step S422 will be explained first.

In the step S422, an adjacent point Q upon the link A or the link B is obtained. The method by which the adjacent point Q is obtained in this step S420 will be explained hereinafter, just as for the previously described adjacent point P. In a step S423, in the following manner, the link A is divided into three new links by the adjacent point P which was obtained in the step S420 and the adjacent point Q which was obtained in the step S422. The first of these links is the link (called the link A1) which connects between one of the end points of the original link A and the adjacent point P. The second of these links is the link (called the link C) which connects between the adjacent point P and the adjacent point Q. And the third of these links is the link (called the link A2) which connects between the adjacent point Q and the other one of the end-points of the original link A. The details of this procedure will be explained subsequently.

In a step S424, just as in the step S423, the link B is divided into three links. In other words, the link B is divided into the link (called the link B1) which connects between one of the end points of the original link B and the adjacent point P, the link (called the link C) which connects between the adjacent point P and the adjacent point Q, and the link (called the link B2) which connects between the adjacent point Q and the other one of the end points of the original link B. It should be understood that the link C which connects between the adjacent point P and the adjacent point Q is identical with the one which was generated by the link A being divided in the step S423. Flag information is appended to this link C which indicates that it is included in two roads, as will be explained hereinafter.

In a step S425, the value of the variable L is updated based upon the results of the steps S423 and S424. In other words, while before the division in the steps S423 and S424 there were two links, i.e. the links A and B, after the division, as described above, these have, become a total of five links A1, A2, B1, B2, and C, so that the number of links has increased by three. Due to this, the value of the variable L is updated here by increasing the value of L by three.

In a step S426, the value of the variable j is incremented by 1. In a step S427, based upon the values of the variable L and the variable j at this time point, a decision is made as to whether or not the variable j is smaller than the variable L. If j>L, the flow of control returns to the step S416. If the variable j is not less than the variable L, in other words, if j≧L, then the flow of control proceeds to the next step S428. In this step S428, the value of the variable i is incremented by 1. After performing the step S428, the flow of control returns to the step S412.

On the other hand, if in the step S421 it is decided that the adjacent point P has not been obtained and the flow of control has proceeded to the step S429, then in the step S429 the value of the variable s is incremented by 1. In the step S430, a decision is made as to whether or not the variable s is less than N. Here, N is the total number of points included in the link B. If s<N, then the flow of control returns to the step S420, while if s≧N then the flow of control proceeds to the next step S431.

In the step S431, the value of the variable k is incremented by 1. In the step S432, a decision is made as to whether or not the variable k is less than M. Here, M is the total number of points included in the link A. If k<M, then the flow of control returns to the step S419, while if k≧M then the flow of control proceeds to the step S426. By doing as explained above, the adjacent link integration procedure is executed.

Figure 9A:
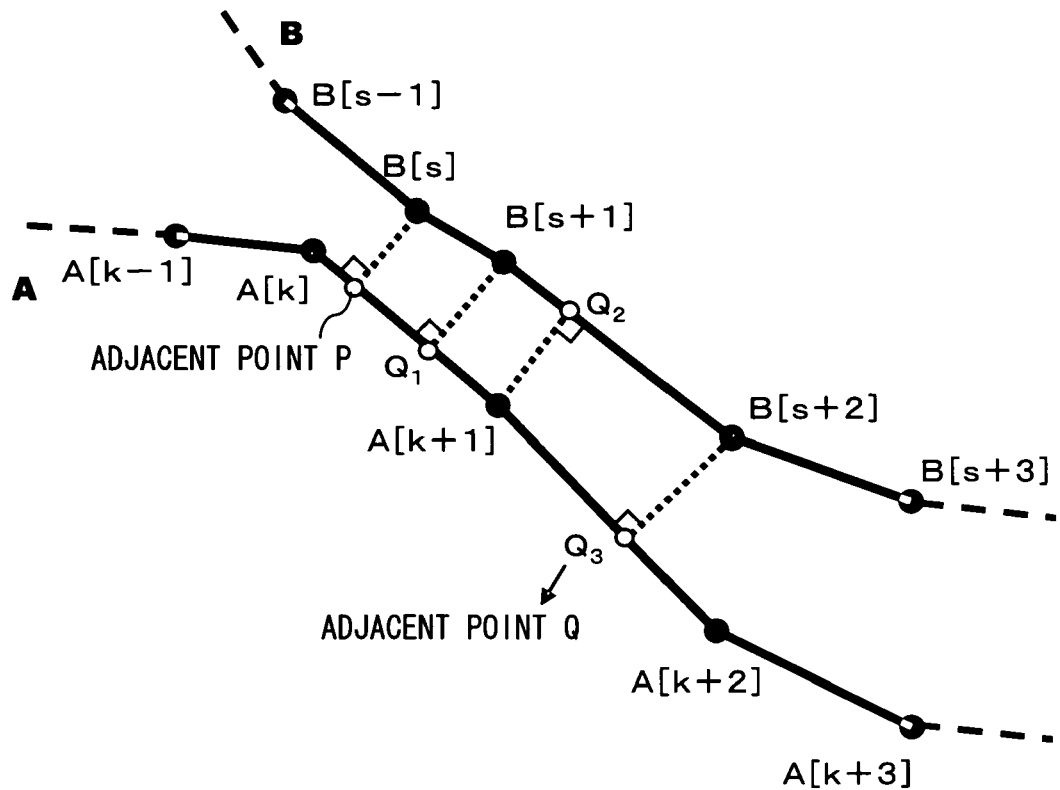
FIGS. 9A and 9B are figures for detailed explanation of a method, in the adjacent link integration procedure, of obtaining an adjacent point P and an adjacent point Q, and separating a link A and a link B by this adjacent point P and this adjacent point Q.
Figure 9B:
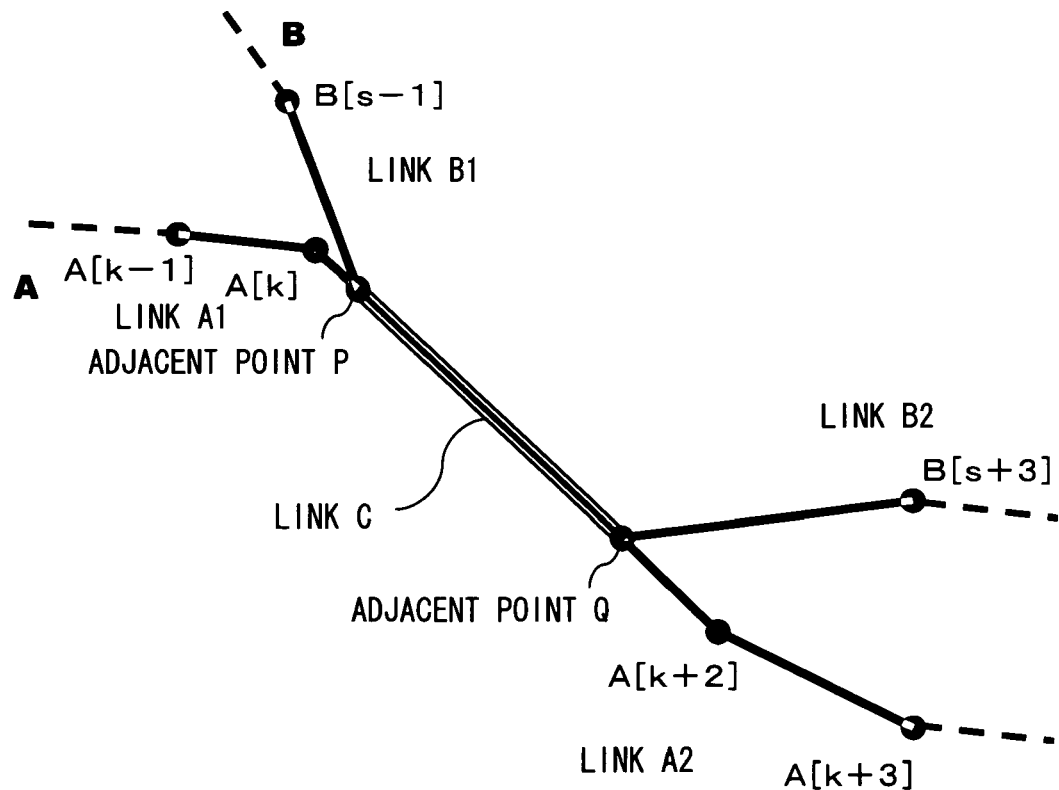

Here, the method for obtaining the adjacent point P in the previously described step S420, and furthermore obtaining the adjacent point Q in the step S422, and dividing the link A and the link B by this adjacent point P and adjacent point Q in the steps S423 and S424, will be explained in detail using FIGS. 9A and 9B. In FIG. 9A, there are shown portions of the link A and the link B. It should be understood that this link A and link B are those which have been selected in the step S413 and the step S416 respectively, and each of which is a portion of one of the plurality of routes which have been found.

The point A[k] and the point B[s] of FIG. 9A are each points which have been selected among the points which are present upon the link A and the link B, based upon the values of the variable k and the variable s which are set at this time point. Here, the point which is the k-th counting from the head of the link A is denoted by A[k], and the point which is the s-th counting from the head of the link B is denoted by B[s]. It should be understood that points upon the link here correspond to the previously described nodes or shape interpolation points.

When the length of a perpendicular line which drops from the point B[s] to the line segment which connects between the point A[k] and the point A[k+1] (termed the line segment Ak) is less than a predetermined length, and moreover when this perpendicular line and the line segment Ak intersect, then the adjacent point P is obtained as the point of intersection between this perpendicular line and the line segment Ak. Or, reversing the relationship between the link A and the link B, it is obtained, when the length of a perpendicular line which drops from the point A[k] to the line segment which connects between the point B[s] and the point B[s+1] (termed the line segment Bs) is less than a predetermined length, and moreover when this perpendicular line and the line segment Bs intersect, as the point of intersection between this perpendicular line and the line segment Bs. The adjacent point P which satisfies either of this type of condition is set upon the line segment Ak or the line segment Bs in the step S420. In FIG. 9A, the situation is shown in which the point of intersection between the perpendicular line which drops from the point B[s] and the line segment Ak is set as the adjacent point P upon the line segment Ak.

It should be understood that, if neither of the above described conditions is satisfied, i.e. if the length of the perpendicular line which drops from the point A[k] upon the line segment Bs, and the length of the perpendicular line which drops from the point B[s] upon the line segment Ak, are both greater than the predetermined length, or the like, then no adjacent point P is set in the step S420. In this case, it is decided in the next step S421 that no adjacent point P has been obtained.

When the adjacent point P is obtained by doing as described above, next, the adjacent point Q is obtained. The adjacent point Q is obtained by setting adjacent points successively one after another upon the line segments from the line segments Ak and Bs in order, just like the adjacent point P, and is set as that adjacent point, among these adjacent points which have been set, for which the length upon the link from the adjacent point P becomes the maximum. A concrete method for obtaining this adjacent point Q will be explained with reference to FIG. 9A.

When the adjacent point P of FIG. 9A has been obtained by doing as described above, next, in the same manner, a adjacent point is also obtained for the perpendicular line which is dropped from the point A[k+1] or the point B[s+1]. This adjacent point is termed $Q_1$. In other words, when the length of a perpendicular line which is dropped from the point B[s+1] to the line segment Ak is less than a predetermined length, and moreover when this perpendicular line and the line segment Ak intersect, this adjacent point $Q_1$ is obtained as the point of intersection of this perpendicular line and the line segment Ak. Or, when the length of a perpendicular line which is dropped from the point A[k+1] to the line segment Bs is less than a predetermined length, and moreover when this perpendicular line and the line segment Bs intersect, then it is obtained as the point of intersection of this perpendicular line and the line segment Bs. In FIG. 9A, the situation is shown in which the point of intersection between the perpendicular line which drops from the point B[s+1] and the line segment Ak is set as the adjacent point $Q_1$ upon the line segment Ak.

When the adjacent point $Q_1$ has been obtained by doing as described above, the next adjacent point $Q_2$ is obtained by the same method, taking as the objects the next (the neighboring) point and line segment for that link upon which this adjacent point Q1 is not set. In other words, in the example of FIG. 9A, when the length of a perpendicular line which is dropped from the point B[s+2] to the line segment Ak is less than a predetermined length, and moreover when this perpendicular line and the line segment Ak intersect, it is obtained as the point of intersection of this perpendicular line and the line segment Ak. Or, when the length of a perpendicular line which is dropped from the point A[k+1] to the line segment Bs+1 is less than a predetermined length, and moreover when this perpendicular line and the line segment Bs+1 intersect, then it is obtained as the point of intersection of this perpendicular line and the line segment Bs+1. In FIG. 9A, the situation is shown in which the point of intersection between the perpendicular line which drops from the point A[k+1] and the line segment Bs+1 is set upon the line segment Bs+1 as the adjacent point $Q_2$.

By doing the same as explained above, adjacent points $Q_3$, $Q_4$, . . . are set in order upon the line segments of the link A or the link B, until the setting conditions for the above described type of adjacent point are no longer satisfied. And the adjacent point $Q_n$ which has been set last becomes the final adjacent point Q. In the example of FIG. 9A, the situation is shown in which the adjacent point $Q_3$ which has been set upon the line segment Ak+1 becomes the adjacent point Q. By doing this, the adjacent point Q is obtained in the step S422.

When the adjacent points P and Q are obtained as described above, next, each of the link A and the link B is divided. As shown in FIG. 9B, the link A is divided into the link A1 from its head to the adjacent point P, the link C from the adjacent point P to the adjacent point Q, and the link A2 from the adjacent point Q to its tail. Furthermore, in the same manner, the link B is also divided into the link B1 from its head to the adjacent point P, the link C from the adjacent point P to the adjacent point Q, and the link B2 from the adjacent point Q to its tail. At this time, the points between the adjacent point P and the adjacent point Q, in other words the points which respectively correspond to the adjacent point P and the previously described adjacent points $Q_1$, $Q_2$, . . . (when the adjacent points have been set, the points at which the perpendicular line from them fall) are deleted. In FIG. 9B, the points B[s], B[s+1], A[k+1], and B[s+2] are deleted. Due to this, for the link B1, the point B[s−1] and the adjacent point P are connected, and, for the link B2, the adjacent point Q and the point B[s+3] are connected. By doing this, in the steps S423 and S424, the link A and the link B are each divided, and their adjacent portions are integrated into the single link C.

It should be understood that, if the adjacent point Q is not obtained, in other words in a case such as when the adjacent point P and the adjacent point Q coincide with one another, then the length of the link C after division is set as 0. Furthermore, if the adjacent point P undesirably coincides with the head portion of the link A or of the link B, then the length of the link A1 after division, or the length of the link B1 after division, is set as 0. In the same manner, if the adjacent point Q coincides with the tail portion of the link A or of the link B, then the length of the link A2 after division, or the length of the link B2 after division, is set to 0. A link for which, after division, the length is set to 0 in this manner is termed a dummy link. If a dummy link set in this manner has been selected as the link A or as the link B in the step S413 or S416, then, by a NO decision being made in the step S414 or the step S417, for this dummy link, the procedure as described above of obtaining an adjacent point is not performed.

Next, the details of the abridged map generation procedure which is executed in the step S500 of FIG. 2 will be explained. In this abridged map generation procedure, an abridged map of each of the routes is generated by simplifying the road shape of each of the routes by executing a procedure which is termed a direction quantization procedure. This direction quantization procedure will now be explained in the following.

In this direction quantization procedure, simplification of the road shapes is performed by dividing the links of each route into respective predetermined numbers of sections. Each of FIGS. 10A, 10B, 10C, and 10D, and FIGS. 11A, 11B, 11C, and 11D is a detailed explanatory figure for explaining the details of this direction quantization procedure: in FIGS. 10A~10D, the details of the direction quantization procedure are shown for the case in which the number of link sections is two (division into two sections); while, in FIGS. 11A~11D, the details of the direction quantization procedure are shown for the case in which the number of link sections is four (division into four sections) In the following, first, explanation will be provided for the case of division into two sections, shown in FIGS. 10A through 10D.

Figure 10A:
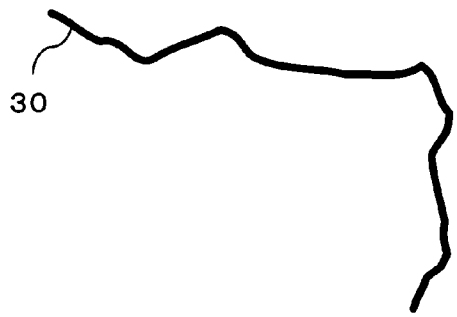
FIGS. 10A, 10B, 10C, and 10D are figures for explanation of the details of a direction quantization procedure for the case of division into two sections, which is taken advantage of when generating the abridged map.
Figure 10B:
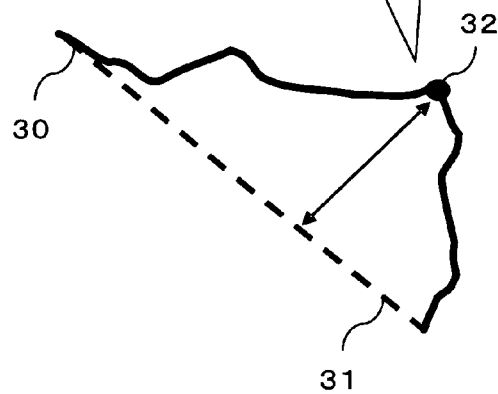

The reference symbol 30 in FIG. 10A designates, by way of example, one of the links included in a route which has been searched out. For this link 30, as shown in FIG. 10B, the point 32 upon this link 30 which is furthest from the line segment 31 which connects together both its end points is selected. It should be understood that the point 32 which is selected here corresponds to a previously described shape interpolation point, and both of the end points correspond to nodes.

Figure 10D:
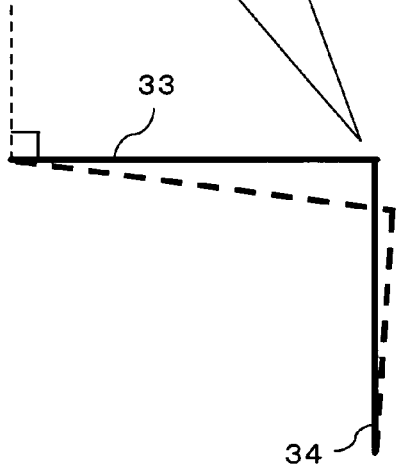
Figure 10C:
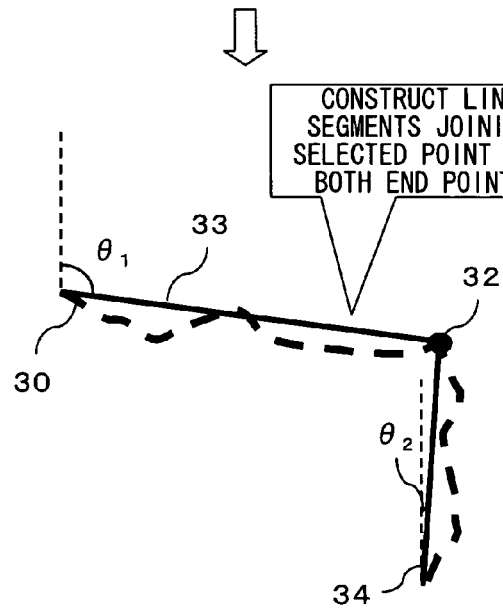

When the point 32 as described above has been obtained, next, line segments 33 and 34 are established which connect, respectively, the two end points of the link 30 with the point 32, as shown in FIG. 10C. The angles respectively formed between these line segments 33 and 34 and reference lines are defined as $\theta_1$ and $\theta_2$ respectively. It should be understood that, here, by reference lines are meant lines which extend from both the end points of the link 30 in a direction which is determined in advance (for example, the true north direction). As shown in FIG. 10C, the angle of the portion which is sandwiched between the reference line from one end point and the line segment 33 is termed $\theta_1$. Moreover, the angle of the portion which is sandwiched between the reference line from the other end point and the line segment 34 is termed $\theta_2$.

After having established the line segments 33 and 34 which connect the point 32 and the two end points of the link 30 respectively in the above described manner, next, as shown in FIG. 10D, the directions of these line segments 33 and 34 are each quantized. Here, quantization of these directions means that each of the line segments 33 and 34 is rotated around its end point as a center so that the above described angles $\theta_1$ and $\theta_2$ become integer multiples of some unit angle which is set in advance. In other words, the values of $\theta_1$ and $\theta_2$ are revised by rotating the respective line segments 33 and 34, so that $\theta_1 = m \cdot \Delta\theta$ and $\theta_2 = n \cdot \Delta\theta$ (where n and m are integers). The values of m and n in the above described equation are set so that the $\theta_1$ and $\theta_2$ after revision which are calculated according to this equation are the closest to their respective original values.

When the directions of the line segments 33 and 34 are both quantized as explained above, the angles $\theta_1$ and $\theta_2$ which the line segments 33 and 34 make with the reference lines are revised so as to be multiples of the unit angle $\Delta\theta$. It should be understood that, in FIG. 10D, $\Delta\theta=15°$. And in the figure an example is shown in which, for $\theta_1$, m is set to be equal to 6, so that the angle after revision becomes 90°, while, for $\theta_2$, n is set to be equal to 0, that the angle after revision becomes 0°.

After having quantized the directions of both of the line segments 33 and 34 in this manner, next, the point of intersection when both of the line segments 33 and 34 are prolonged is obtained. And the lengths of both of the line segments 33 and 34 are revised, so as to connect this point of intersection with both of the end points, as shown in FIG. 10D.

As has been explained above, the direction quantization procedure for the case of division of the link 30 into two sections is performed by obtaining the line segments 33 and 34, and by quantizing their directions as well as adjusting their lengths. By using these line segments 33 and 34 instead of the link 30, it is possible to display the shape of the link 30 in a simplified manner. Since, at this time, the shape of the link 30 is simplified in the state in which the positions of both the endpoints of the link 30 are fixed, thus no influence is exerted upon the positions of the adjacent links. Accordingly it is possible easily to simplify the shape of a road, with maintaining the overall positional relationships of the route, by simplifying each of the link shapes of the route by using this direction quantization procedure.

Figure 11A:
FIGS. 11A, 11B, 11C, and 11D are figures for explanation of the details of a direction quantization procedure for the case of division into four sections.
Figure 11B:
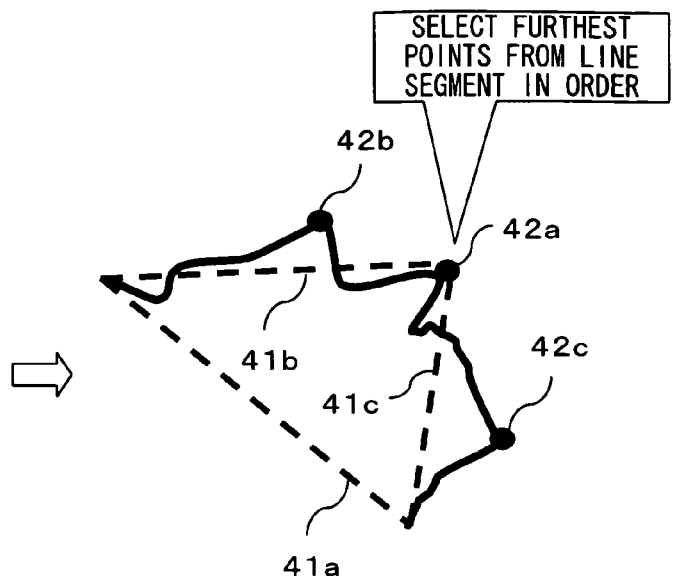

Next, the case of division into four sections will be explained. In FIG. 11A, just as in FIG. 10A, the reference symbol 40 denotes, as an example, one link included in a route which has been searched out. For this link 40, first, as shown in FIG. 11B, the point 42a upon the link 40 which is furthest from the line segment 41a which joins together both the end points of this link 40 is selected. Next, the two line segments 41b and 41c which connect together this point 42a and the two end points of the link 40 are established, and the points 42b and 42c upon the link 40 which are respectively positioned furthest away from these line segments 41b and 41c are selected. It should be understood that the points 42a through 42c which are selected here all correspond to the previously described nodes or shape interpolation points, just as in the case of division into two sections.

After having obtained the points 42a through 42c as described above, next, as shown in FIG. 11C, just as in the case of division into two sections, the line segments 43, 44, 45, and 46 are established which connect together the end points of the link 40 and the points 42a through 42c, in their respective order. The angles respectively formed between these line segments 43 through 46 and reference lines are expressed as $\theta_3$, $\theta_4$, $\theta_5$, and $\theta_6$ respectively. It should be understood that the reference lines at this time are not only determined at both the end points of the link 40, but rather are also determined at the point 42a which was initially selected, and which is positioned at the center of the points 42a through 42c.

After having established the line segments 43 through 46 as described above, next, as shown in FIG. 11D, the direction of each of these line segments is quantized. At this time, taking the point 42a as a preserved point, the line segments 44 and 45 are each rotated about this preserved point 42a as a center. It should be understood that, for the line segments 43 and 46, each is rotated about its end point as a center, in the same manner as in the case of division into two sections. Here an example is shown in which $\Delta\theta=15°$ is set in advance, and, after revision, the angles $\theta_3$, $\theta_4$, $\theta_5$, and $\theta_6$ have become, respectively, 60°, 45°, 180°, and 60°.

Figure 11D:
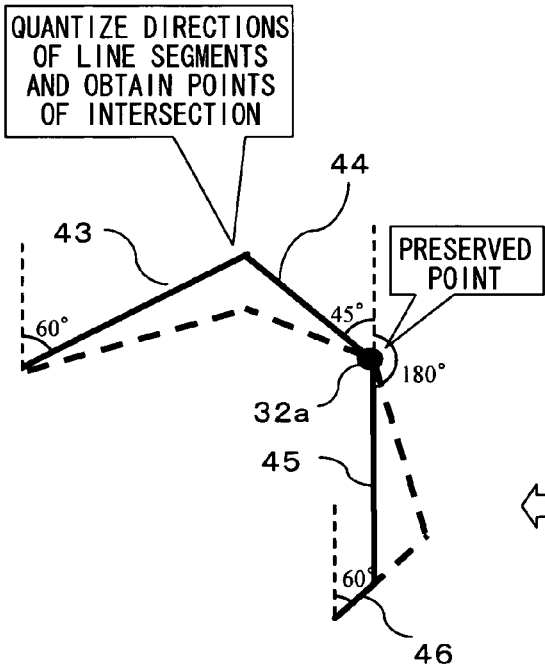
Figure 11C:
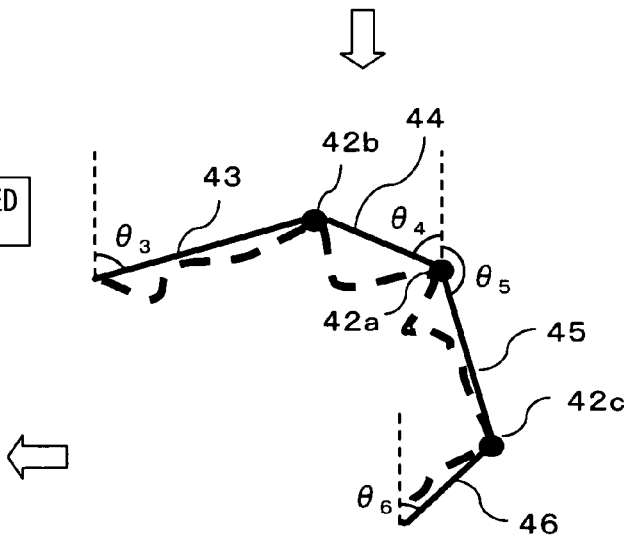

After having quantized the directions of each of the line segments 43 through 46 in this manner, next, the points of intersection are obtained when the line segments 43 and 44 have both been prolonged, and when the line segments 45 and 46 have both been prolonged. And, as shown in FIG. 11D, the lengths of the line segments 43 through 46 are each revised, so that each of the points of intersection is connected with each of the end points or the preserved point 42a.

As has been explained above, the direction quantization procedure for division of the link 30 into four sections is performed by obtaining the line segments 43 through 46, and by quantizing their directions as well as adjusting their lengths. By using these line segments 43 through 46 instead of the link 40, it is possible to display the shape of the link 40 in a simplified manner. At this time, the shape of the link 40 is simplified in a state in which, in addition to the positions of both the end points of the link 40, also the position of the preserved point 42a is also fixed. Accordingly, it is possible to simplify the shape of a road appropriately while maintaining its overall positional relationships, even for a route which is made up from links of a complicated shape.

It should be understood that although, in the above, the direction quantization procedure has been explained for the cases of division into two sections and division into four sections, it would also be possible to perform this direction quantization procedure in the same manner for division into any other number of sections. For example, in a case of division into eight sections, first, just as in the case of division into four sections, the furthest point from the line segment which connects together both end points of the link, and the furthest two points from each of the two line segments which connect together that point and the two end points, are selected. After this, further, the furthest four points from each of the four line segments which connect between these three points with the addition of both the endpoints are selected. By doing this, eight line segments are obtained which connect in order between the total of seven points and the two end points which have been selected, and it is possible to perform a direction quantization procedure of division into eight portions by performing quantization of the directions and adjustment of the lengths of these line segments, in the manner previously described.

How many sections should be employed for the direction quantization procedure may be set in advance, or may also be decided according to the shapes of the links. For example when, as described above, proceeding to select in order the furthest point from each line segment which joins between both end points or the points which have been selected up till this time—in other words, when repeating the procedure explained in FIGS. 10B and 11B—then the procedure may be repeated until the distance from each of the line segments to the furthest point becomes less than a predetermined value, and a number of points may be selected in order corresponding to the number of times that procedure was performed. If this is done, it is possible to determine upon the number of sections for the direction quantization procedure according to the shapes of the links.

In the direction quantization procedure of division into two sections which was explained with reference to FIGS. 10A through 10D, it may happen that there is no appropriate point of intersection, even though both of the line segments 33 and 34 after their directions have been quantized are prolonged. In other words, if the line segments 33 and 34 become parallel to one another after their directions have been quantized, it may happen that no point of intersection exists, since when these lines segments are prolonged, they both combine together to become a single line segment which connects together both of the end points of the link 33. In this type of case, the shape of the link 30 may be shown as simplified by using the line segment which directly connects together both of its end points, in other words by using the line segment 31. Furthermore, in the direction quantization procedure of division into four sections which was explained with reference to FIGS. 11A through 11D, or in a direction quantization procedure of division into more sections than four, in the same manner, if no appropriate point of intersection exists when the line segments are prolonged after quantizing their directions, then it will be acceptable to perform a direction quantization procedure in which the number of sections is smaller.

It is possible to generate an abridged map by simplifying the road shape of each route by performing a direction quantization procedure as has been explained above upon all of the links of each route in order. It should be understood that it would also be acceptable to execute the direction quantization procedure as described above, not by units of links, but rather for each of link series which are made up by lining up a plurality of links. In this case not only shape interpolation points, but also nodes, come to be included in the points which are selected as the point 32 of FIG. 10B or as the points 42a through 42c of FIG. 11B.

Or, in the abridged map generation procedure of the step S500, it is also possible to simplify the road shape of each route, without executing the above described direction quantization procedure. In this connection, a method of simplifying the road shapes of the routes by approximating the shape of each link with a curve will now be explained with reference to FIGS. 12A, 12B, and 12C.

Figure 12A:
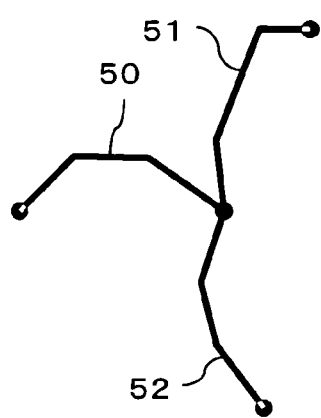
FIGS. 12A, 12B, and 12C are figures for explanation of a method for simplifying the road shapes of routes by approximating each of the link shapes with a curve.
Figure 12B:
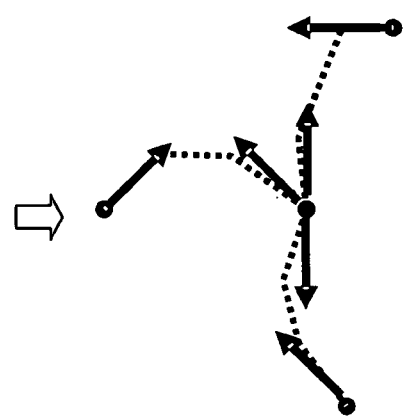

In FIG. 12A, by way of example, links 50, 51, and 52 are shown as one part of the links included in a route which has been found. For these links 50 through 52, first, as shown in FIG. 12B, the link directions quantized at both end points of each link are obtained. Here, in the same manner as when performing quantization of the directions of each line segment in the previously described quantization procedure, the link direction is obtained which is the integral multiple of a unit angle closest to the original angle. As a result, link directions at each end point are obtained like those shown by the arrow signs in FIG. 12B.

Figure 12C:
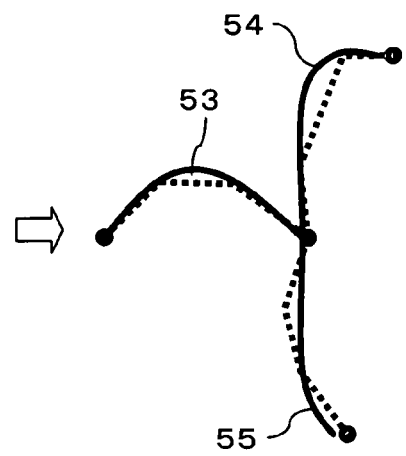

Next, as shown in FIG. 12C, the shape of each of the links is approximated by a curve, by obtaining curves 53, 54, and 55 which connect between its end points. At this time, the shape of each of the curves 53 through 55 is determined so that the direction of the tangent line in the vicinity of the end points of each curve agrees with the above described quantized link direction. It should be understood that although, as methods for obtaining this type of curve, spline approximation or the like using, for example, spline functions are available, the detailed explanation thereof will herein be omitted.

It is possible to generate an abridged map in which the road shape of each route is simplified by proceeding with the execution of procedures like those explained above for all the links of each route in order, and by displaying the road shapes using the curves which have been obtained. At this time as well, the shape of each link is simplified in a state in which the positions of both of the end points of that link are fixed, in the same way as in the case of the direction quantization procedure. Accordingly, in this case as well, it is possible to simplify the road shape of each route in a simple manner, while maintaining its overall positional relationships.

According to the embodiment explained above, the following operational benefits are obtained.

(1) Before generating an abridged map of a plurality of routes which have been searched out, the links of each of the routes are compactified (in the step S400), based upon the relative positional relationships of the routes. By doing this, when generating an abridged map of a plurality of routes, it is possible to compactify the links of the various routes in advance, so as appropriately to simplify the road shapes.

(2) By performing the adjacent link integration procedure in the link compactification procedure (in the step S410), when any two or more routes among the routes having adjacent portions, these adjacent portions are integrated into a single link. By doing this, it is possible to compactify the links of each routes so that the road shapes for a plurality of routes which are mutually adjacent one another are appropriately simplified.

(3) The adjacent point P is obtained (in the step S420) upon either one of the link A or the link B, and furthermore the adjacent point Q is obtained (in the step S422). And it is arranged (in the steps S423 and S424) to make a single link C by connecting together the adjacent point P and the adjacent point Q, and to divide the link A and the link B into the links A1 and B1 which connect from their respective heads to the adjacent point P, the link C, and the links A2 and B2 which connect from the adjacent point Q to their respective tails. By doing this, it is possible to integrate the adjoining portions of the plurality of routes into a single link in a simple manner.

(4) Since it is arranged to append, to a single link in which the adjoining portions have been integrated, flag information which shows that a plurality of roads are included in this link, accordingly, when drawing this link in the abridged map after having abridged it, it is possible to draw it in such a display format based upon this flag information, that each of the plurality of routes can be individually distinguished.

It should be understood that, in the above described embodiment, it may be arranged to determine in advance where each of the searched-out routes intersect one another before performing the adjacent link integration procedure. Furthermore, at this time, it may be arranged also to determine in advance the mutual connection relationships between routes which do not directly intersect, although they pass the same position, as for an overhead-crossing intersection. If it is arranged to execute the adjacent link integration procedure after having determined in advance the connection relationship between the routes in this manner, then it is possible to proceed in an efficient manner by performing the procedure, predominantly, upon the vicinity of the points of connection.

Although, in the above described embodiment, the explanation is made in terms of an example in which the map data is read out from a storage media such as a DVD-ROM or the like by the navigation apparatus, and an abridged map is generated, the present invention is not limited by these details. For example, it would also be possible to apply the present invention to a communicating navigation apparatus or the like which downloads the map data from an information distribution center, using wireless communication with a portable telephone or the like. In this case, the procedure of generating an abridged map as explained above may be performed by the information distribution center, with the result thereof being outputted from the information distribution center as a signal which is distributed to the navigation apparatus. In other words, the information distribution center consists of an apparatus which generates the abridged map, and an apparatus which outputs this abridged map to the outside as a signal.

Figure 13:
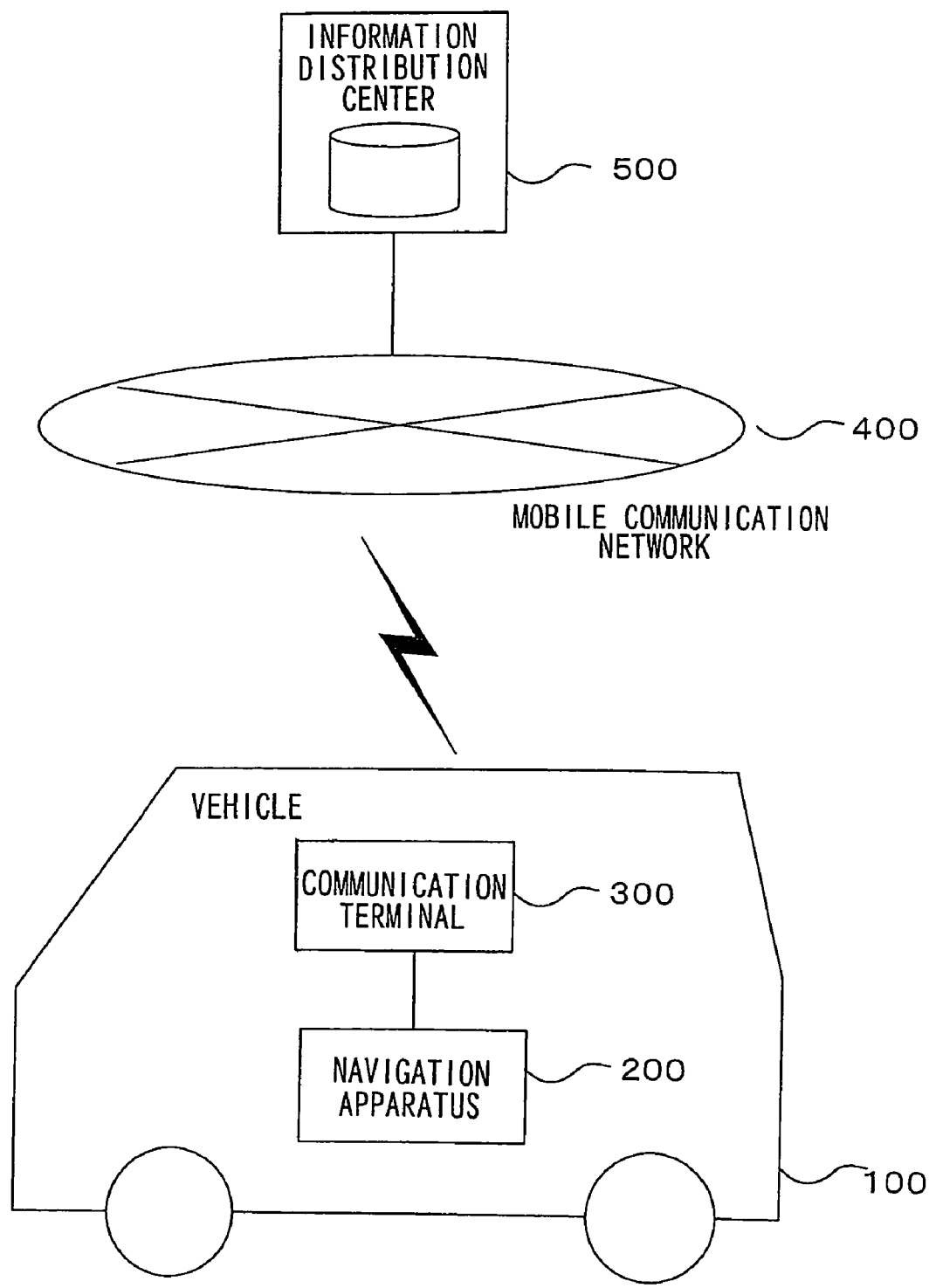
FIG. 13 is a figure showing a situation in which the present invention is applied to a communicating navigation system.

FIG. 13 is a figure illustrating this situation. A communication terminal 300 is connected to a navigation apparatus 200 which is fitted to a vehicle 100. A portable telephone or the like is used in this communication terminal 300. The communication terminal 300 is connected wirelessly to a mobile communication network 400. An information distribution center 500 is connected to the mobile communication network 400. In other words, the navigation apparatus 200 is connected to the information distribution center 500 via the communication terminal 300 and the mobile communication network 400. When the navigation apparatus 200 is connected to the information distribution center 500, it transmits a distribution request for the map data to the information distribution center 500. According to this distribution request, the information distribution center 500 performs the procedures detailed above, and distributes the map data to the navigation apparatus 200. The navigation apparatus 200 receives the map data which has been distributed from the information distribution center 500 via the mobile communication network 300 and the communication terminal 200. The present invention may be applied to this type of communicating navigation system as well.

Figure 14:
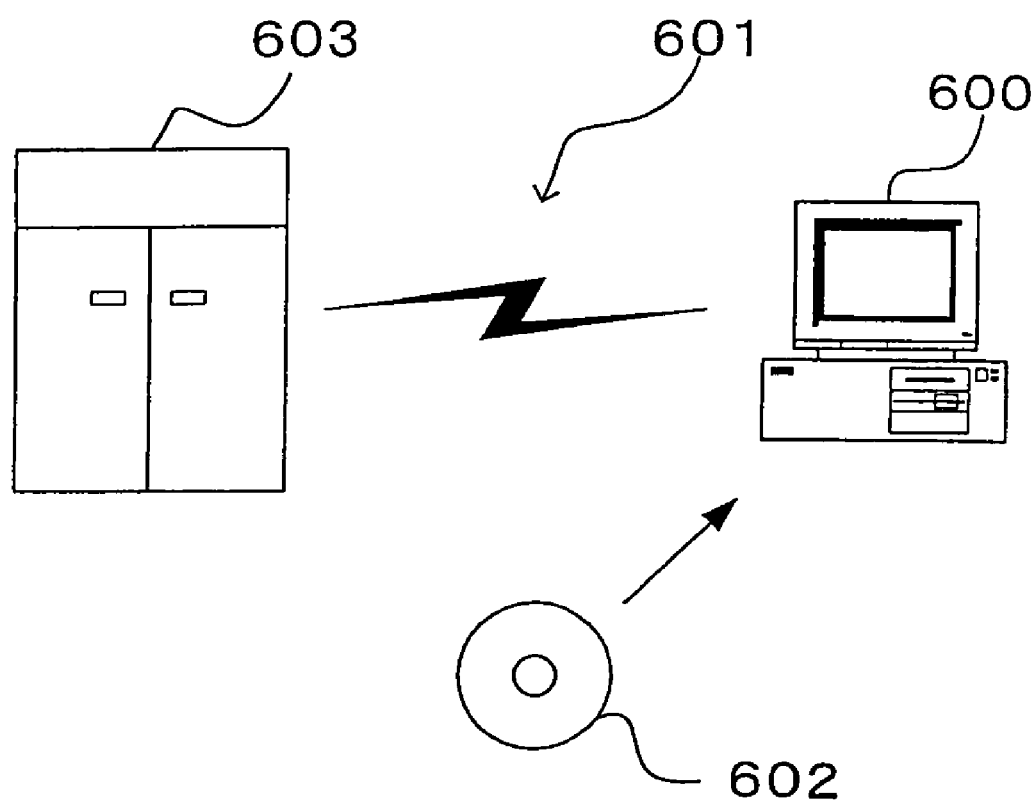
FIG. 14 is a figure showing a situation in which the present invention is applied to a personal computer.

It should be understood that, if the present invention is applied to a personal computer or the like, then it is possible to provide a program related to the above described type of control via a recording medium such as a CD-ROM or the like, or via an electrical communication channel such as the Internet or the like. FIG. 14 is a figure illustrating this situation. A personal computer 600 receives supply of a program via a CD-ROM 602. Furthermore, the personal computer 600 is endowed with a function of connection to a communication channel 601, so that the above described program may be supplied from a server 603. The communication channel 601 is a communication channel such as the internet, a personal computer link or the like, or is a dedicated communication channel or the like. The server 603 transmits the program via the communication channel 601 to the personal computer 600. In other words, it converts the program to a data signal upon a carrier wave, and transmits it via the communication channel 601. In this manner, the program may be supplied, in the form of a computer program product which can be read in by a computer, in various formats, such as a recording medium or a carrier wave or the like.

The present invention is not limited to the above described embodiments. Other modes which may be conceived of within the range of the technical concept of the present invention are also included within the range of the present invention.

What is claimed is:

1. An abridged map generating apparatus, comprising:
   a route searching unit that searches for a plurality of routes from a departure point to a destination which has been set;
   an abridged map generation unit that generates an abridged map in which road shapes of the routes which are searched out by the route searching unit are simplified, based upon road map data which specifies shapes of roads by shapes of links set for each predetermined road section; and
   a link compactification unit that compactifies links of the routes based upon relative positional relationships of the routes before the abridged map generation unit generates the abridged map, wherein if any two or more of the routes have respective adjacent portions where a distance between the routes is less than a predetermined value, the link compactification unit:
   obtains a first adjacent point and a second adjacent point upon either a first link or a second link, where each link is a portion of some one of a plurality of the routes and the distance between the respective links is less than the predetermined value, between both ends of the first link or the second link;
   determines a single third link by connecting the first adjacent point and the second adjacent point; and
   divides the first link and the second link into fourth and fifth links from respective heads of the first and second links to the first adjacent point, the third link, and sixth and seventh links from the second adjacent point to respective tails of the first and second links so that the first link is replaced with the fourth, third and sixth links, and the second link is replaced with the fifth, third and seventh links, for compactifying the links of the routes by integrating the adjacent portions into a single link.

2. An abridged map generating apparatus according to claim 1, wherein:
   flag information indicating that a plurality of roads are included in a link is appended to the single link into which the adjacent portions have been integrated.

3. An on-vehicle information terminal, comprising:
   an abridged map generating apparatus according to claim 1; and
   a display control unit that causes an abridged map generated by the abridged map generating apparatus to be displayed upon a display monitor.

4. An abridged map distribution system, comprising:
   an abridged map generating apparatus according to claim 1;
   a distribution apparatus that distributes an abridged map generated by the abridged map generating apparatus; and
   a navigation apparatus that receives the abridged map distributed by the distribution apparatus.

5. An abridged map generating method, comprising:
   searching for a plurality of routes from a departure point to a destination which has been set;
   generating an abridged map in which road shapes of the routes which are searched out are simplified based upon road map data which specifies shapes of roads by shapes of links set for each predetermined road section;
   if any two or more of the routes have respective adjacent portions where a distance between the routes is less than a predetermined value, obtaining a first adjacent point and a second adjacent point upon either a first link or a second link, where each link is a portion of some one of a plurality of the routes and the distance between the respective links is less than the predetermined value, between both ends of the first link or the second link;
   determining a single third link by connecting the first adjacent point and the second adjacent point; and
   dividing the first link and the second link into fourth and fifth links from respective heads of the first and second links to the first adjacent point, the third link, and sixth and seventh links from the second adjacent point to respective tails of the first and second links so that the first link is replaced with the fourth, third and sixth links, and the second link is replaced with the fifth, third and seventh links, for compactifying the links of the routes by integrating the adjacent portions into a single link.

* * * * *